(12) United States Patent
Huang et al.

(10) Patent No.: US 6,749,465 B1
(45) Date of Patent: Jun. 15, 2004

(54) CARD CONNECTOR WITH REINFORCING STRUCTURE

(75) Inventors: Che-Hung Huang, Taoyuan (TW); Steven Hsu, Taoyuan (TW)

(73) Assignee: High Tech Computer, Corp., Tao Yuan (TW)

( * ) Notice: Subject to any disclaimer, the term of this patent is extended or adjusted under 35 U.S.C. 154(b) by 0 days.

(21) Appl. No.: 10/604,249

(22) Filed: Jul. 4, 2003

(30) Foreign Application Priority Data

Apr. 2, 2003 (TW) ..................................... 92205187 U

(51) Int. Cl.[7] .............................................. H01R 24/00
(52) U.S. Cl. ...................................................... 439/630
(58) Field of Search ................................. 439/630–637, 439/59–62, 325–328, 64, 94.5, 946, 79, 607, 159–160

(56) References Cited

U.S. PATENT DOCUMENTS

| | | | |
|---|---|---|---|
| 6,227,879 B1 * | 5/2001 | Dong | 439/92 |
| 6,227,893 B1 * | 5/2001 | Kaneko | 439/326 |
| 6,234,809 B1 * | 5/2001 | Futatsugi | 439/64 |
| 6,264,483 B1 * | 7/2001 | Wilson | 439/137 |
| 6,386,909 B1 * | 5/2002 | Hsia et al. | 439/541.5 |
| 6,409,546 B1 * | 6/2002 | Ito et al. | 439/630 |
| 6,454,574 B1 * | 9/2002 | Yu | 439/79 |
| 6,475,000 B1 * | 11/2002 | Hu et al. | 439/79 |
| 6,579,126 B2 * | 6/2003 | Narumo et al. | 439/630 |
| 6,599,152 B1 * | 7/2003 | Oliphant et al. | 439/660 |

* cited by examiner

Primary Examiner—Ross Gushi
(74) Attorney, Agent, or Firm—Jiang Chyun IP Office

(57) ABSTRACT

A card connector (200) with a reinforcing structure (230) is provided for used in a handheld device. The card connector can mate with an elongated expansion card (10) which when inserted into the card connector has a portion located outside the handheld device. The card connector comprises an insulated main body (210) and a plurality of terminals (220) fixed to the main body. The terminals are used for electrically connecting the elongated expansion card with a printed circuit board (20) on which the card connector is mounted. The reinforcing structure (230) is formed from highly rigid material or high molecular weight polymer. The reinforcing structure strengthens the card connector against any external force resulting from subjecting the elongated expansion card to an external force, whereby the electrical connection between the terminals and printed circuit board will not break due to the external force.

20 Claims, 5 Drawing Sheets

CARD CONNECTOR WITH REINFORCING STRUCTURE

CROSS REFERENCE TO RELATED APPLICATIONS

This application claims the priority benefit of Taiwan application serial no. 92205187, filed on Apr. 2, 2003.

BACKGROUND OF INVENTION

1. Field of Invention

The present invention relates to a card connector. More particularly, the present invention relates to a card connector with a reinforcing structure.

2. Description of Related Art

Personal digital assistant (PDA) is a versatile portable device used by professional and non-professional people alike. The design concept of a personal digital assistant is to provide a user with an electronic (digital) notebook capable of registering and sorting out important data that may be of some help in managing travel schedules, organizing meetings, and providing communication memos. With the big leap in the operating speed of computers, the ease of Internet connection and the advance in wireless communication technologies, most personal digital assistants now provide a variety of functions including wireless communication, network accessing, playing games and multimedia services. PDA is frequently regarded as a "palm-top computer".

In general, a PDA has a built-in data storage device with moderate data storage capacity for holding user's files and data. However, to provide extra data storage capacity, a small memory card can be added to the PDA. At present, a large number of memory cards with many different types of specifications are found in the market. The most common memory cards are the secure digital card (SD Card) and the compact-flash card (CF Card). To utilize an external memory card as an extra data storage device, a card connector capable of accommodating a memory card of the desired specifications must be installed on the PDA. When a memory card is properly plugged into the card connector on the PDA, file or data can read, write or erase through signals carried via the card connector. In addition, elongated expansion cards for plugging into the card connector of a PDA at one end and protruding outside the PDA at the other end are also available in the market. The elongated expansion card includes, for example, a digital camera card for capturing image or picture data from a miniature digital camera or a wireless local area network (WLAN) card for connecting up with a wireless local area network (WLAN).

FIG. 1A is a top view of a conventional PDA card connector 100 and an elongated expansion card 10 to be inserted into the card connector 100. As shown in FIG. 1A, the card connector 100 has an insulation body 110 and a plurality of terminals 120. The insulation body 110 is an integrative unit having two side beams 112, 114 and a horizontal beam 116 joined together to form a U-shaped frame. Typically, the insulation body 110,is made from plastic with some areas strengthened and OLE_LINK2protected from electrostatic dischargeOLE_LINK2 by incorporating some metallic casing material (not shown). Furthermore, the side beams 112, 114 have sliding grooves 112a, 114a suitable for accommodating the two edges of the elongated expansion card 10 such as a digital camera card or a wireless local area network (WLAN) card. The horizontal beam 116 defines a terminal plugging slot 118 for receiving the front ends of the socket terminals 12 of the expansion card 10. In addition, terminals 120 are positioned on the horizontal beam 116. One end of the terminal 120 is a free end 122 while the other end is a fixed end 124. The free end 122 of the terminal 120 extends in the terminal plugging slot 118. When the front end of the elongated expansion card 10 is plugged into the terminal plugging slot 118, the free ends 122 of the terminals 120 are elastically pressed and electrically connected to the socket terminals 12 of the elongated expansion card 10. Meanwhile, the fixed ends 124 of the terminals 120 extend beyond the horizontal beam 116 and are fixed and electrically connected to a printed circuit board 20.

Note that the fixed ends 124 of the terminals 120 of the conventional card connector 100 are fixed onto the printed circuit board 20 through surface mounting technology due to the limit space within a PDA. However, with further miniaturization of the PDA, the thickness of the PDA body is further reduced. Because one end of the elongated expansion card 10 is exposed outside the PDA body 30 as shown in FIG. 1B, any external forces acting on the elongated expansion card 10 (such as dropping the PDA vertically onto the floor) will be directly transmitted to the card connector 100. As a result of the impact on the card connector 100, the fixed ends 124 of the terminals 120 will likely break away from the printed circuit board 20 and lead to a failed connection. Worse, the loose card connector 100 can possibly further impinge on other electronic components (not shown) on the printed circuit board 20 to damage the normal function of the PDA.

SUMMARY OF INVENTION

Accordingly, one object of the present invention is to provide a card connector with a reinforcing structure for reinforcing the strength of the card connector.

To achieve these and other advantages and in accordance with the purpose of the invention, as embodied and broadly described herein, the invention provides a card connector with a reinforcing structure set up on a circuit board. The card connector comprises an insulated main body, a plurality of terminals and a reinforcing structure. The insulated body has two side beams and a horizontal beam. The side beams are attached to the respective ends of the horizontal beam to form a U-shaped frame body. The side beams each have a sliding groove capable of accommodating the two side edges of aplug-in elongated expansion card. Furthermore, the horizontal beam has at least a terminal plugging slot for accommodating the socket terminals of the elongated expansion card. In addition, terminals are set up in the horizontal beam with one end of each terminal extending towards the terminal plugging slot and the other end of the terminal extending away from the terminal plugging slot. The ends of the terminals away from the terminal plugging slot are in turn fastened and electrically connected to the printed circuit board by surface mounting technology. The reinforcing structure is set up on one side of the horizontal beam away from the terminal plugging slot. The reinforcing structure includes a bump bar fixed over the circuit board. The bump bar has a comb shaped surface for engaging a vertical rear surface of the horizontal beam. Furthermore, the teeth of the comb roughly occupy the space between the ends of neighboring terminals.

According to one embodiment of this invention, the bump bar is attached to the printed circuit board through surface mounting. Besides, the bump bar can have a threaded bolt extension that can pass through the printed circuit board and the reinforcing structure includes a lock nut that can screw onto the threaded bolt to lock the printed circuit board and the bump bar tightly together. Furthermore, the top end of the bump bar may incorporate a pressing block that contacts top surface of the horizontal beam to increase the strength at the top end of the insulated body.

According to one embodiment of this invention, the reinforcing structure can be a screw and with the bump bar having an internally threaded hole. The screw passes through the printed circuit board and screws into the threaded hole in the bump bar so that the printed circuit board and the bump bar are locked tightly together. Furthermore, the top end of the bump bar may incorporate a pressing block engaging a top surface of the horizontal beam to increase the strength of the connector in resisting an external force. In addition, the reinforcing structure can be a screw and a nut and with the bump bar having a through hole. The screw passes through the through hole in the bump bar and the printed circuit board so that the nut can be screwed onto the exposed end of the screw to lock the bump bar and the printed circuit board together.

According to a further embodiment of this invention, the reinforcing structures can beattached to the outer casing of the PDA. The bump bar is riveted to the outer casing and located between the outer casing and the printed circuit board. A screw extends from a bottom of the printed circuit board through the printed circuit board to threadedly engage in the bump bar. Thus, the outer casing, the bump bar and the printed circuit board are connected together. Still a further embodiment of the present invention, the reinforcing structure has a shielding securely fixed to the card connector. The shielding has a portion extending rearwards to a position behind the terminals of the connector. A screw extends through the extended portion of the shielding and the printed circuit board to threadedly engage with a nut at a bottom face of the printed circuit. The screw has a head abutting against a vertical portion of the shielding, whereby a forced acting on the connector can be effectively resisted by the assistance of the reinforcing structure.

This invention deploys a reinforcing structure to strengthen the card connector. Hence, the fixed terminals on the card connector are protected against electrical disconnection due to impact forces acting on the elongated expansion card (due to a free fall of the PDA body from a high point to the ground).

It is to be understood that both the foregoing general description and the following detailed description are exemplary, and are intended to provide further explanation of the invention as claimed.

BRIEF DESCRIPTION OF DRAWINGS

The accompanying drawings are included to provide further understanding of the invention, and are incorporated in and constitute a part of this specification. The drawings illustrate embodiments of the invention and, together with the description, serve to explain the principles of the invention.

DETAILED DESCRIPTION

Figure 1A:
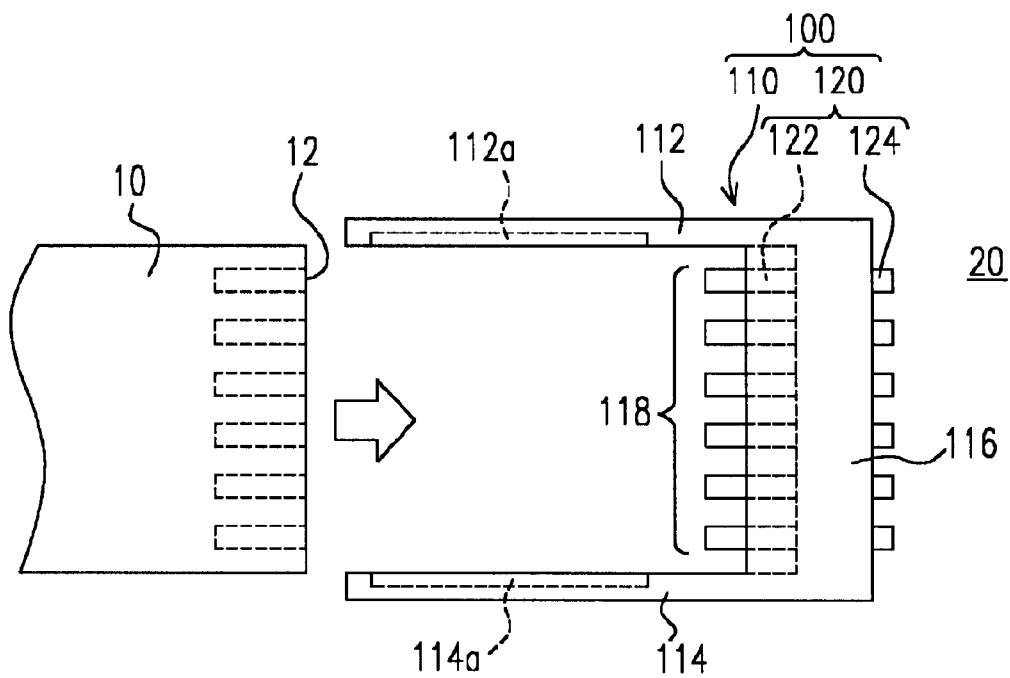
FIG. 1A is a top view of a conventional PDA card connector and an elongated expansion card to be inserted into the connector.
Figure 1B:
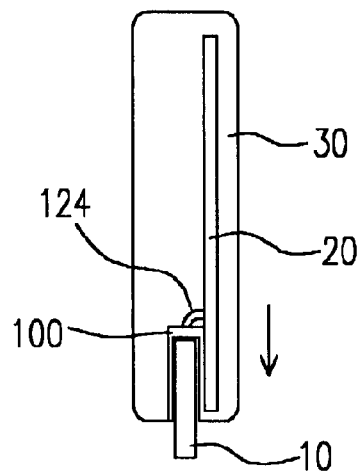
FIG. 1B is a diagram showing a falling handheld device, for example a PDA likely to subject the elongated expansion card and the card connector to an impact force.

Reference will now be made in detail to the present preferred embodiments of the invention, examples of which are illustrated in the accompanying drawings. Wherever possible, the same reference numbers are used in the drawings and the description to refer to the same or like parts.

Figure 2:
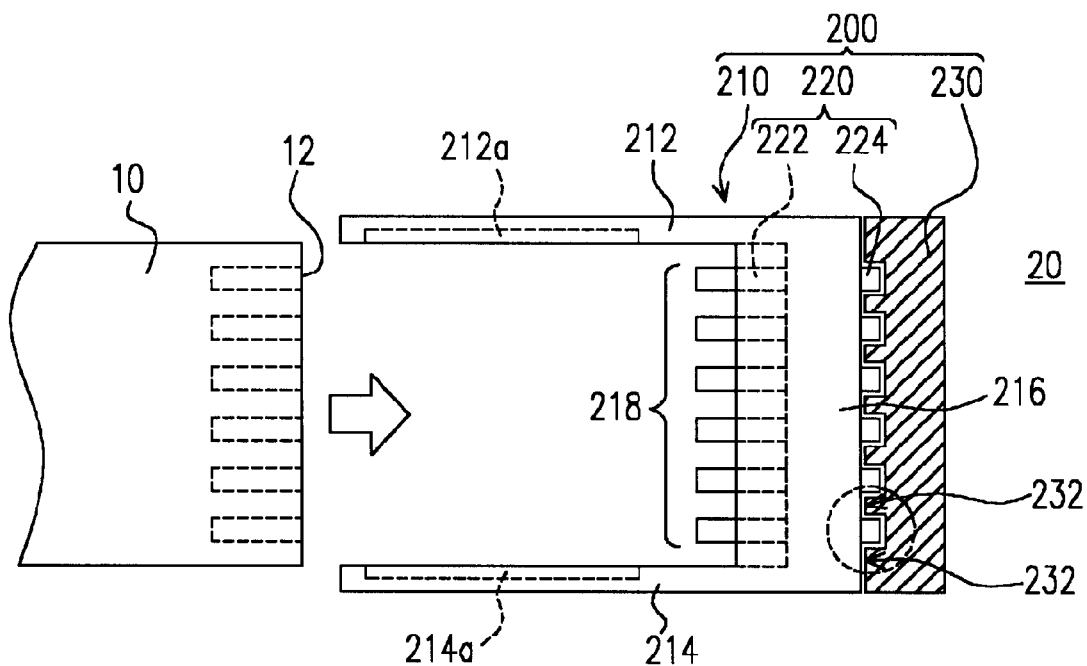
FIG. 2 is a diagram showing a card connector assembly with a reinforcing structure according to one preferred embodiment of this invention.

FIG. 2 is a diagram showing a card connector 200 with a reinforcing structure according to one preferred embodiment of this invention and an elongated expansion card 10 to be inserted into the connector 200. The card connector 200 has an insulation body 210, a plurality of terminals 220 and a reinforcing structure 230. The insulation body 210 is, for example, an integrative unit having two side beams 212, 214 and a horizontal beam 216 joined together to form a U-shaped frame. Typically, the insulation body 210 is made from plastic with some areas strengthened and protected from electrostatic discharge by incorporating some metallic casing material (not shown). Furthermore, the side beams 212, 214 have sliding grooves 212a, 214a suitable for accommodating the two edges of the elongated expansion card 10 such as a digital camera card or a wireless local area network (WLAN) card. The horizontal beam 216 has a terminal plugging slot 218 for receiving the front ends of the socket terminals 12 of the expansion card 10. In addition, terminals 220 are positioned on the horizontal beam 216 of the insulated body 210 with the terminals 220 attached to the circuit board 20 through surface mounting. One end of the terminal 220 (the free end) 222 extends towards the terminal plugging slot 218 to engage elastically and connect electrically with a socket terminal 12 in the elongated expansion card 10. Meanwhile, the other end 224 of the terminals 220 (the fixed end) extends beyond the horizontal beam 216 and soldered to a printed circuit board 20 via surface mounting technology so that the terminal is fastened and electrically connected to the printed circuit board 20.

Figure 3A:
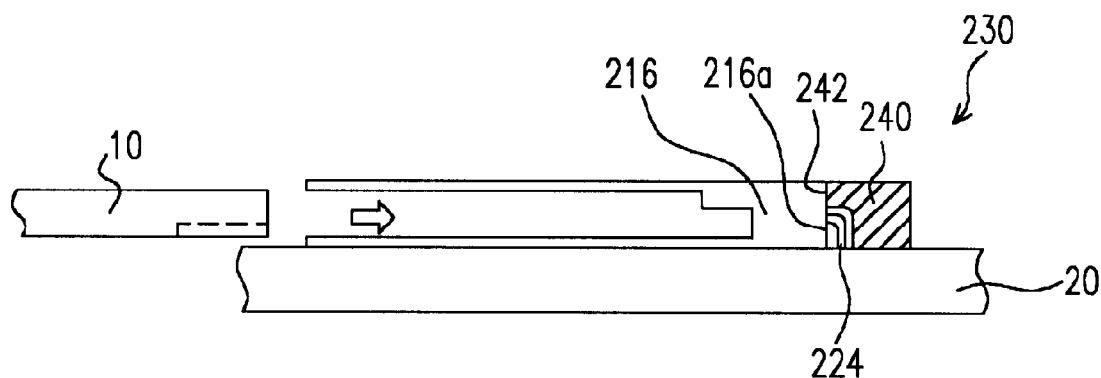
FIGS. 3A to 3E are sectional views showing five different types of reinforcing structures on a card connector assembly according to this invention.

The reinforcing structure 230 or the strengthening structure for the connector is positioned behind the horizontal beam 216 (away from the terminal plugging slot) to reinforce the card connector 200 against any impact on the elongated expansion card 10. The reinforcing structure 230 has a comb-shaped bump surface 232 that corresponds with the vertical rear surface 216a of the horizontal beam 216 (as shown in FIG. 3A). The comb-shaped bump surface 232 crosses over the fixed ends 224 of the terminals 220 but avoids any contact with the fixed ends 224. The reinforcing structure 230 can be fabricated using high strength material including, for example, stainless steel alloy or other metallic material. Alternatively, a high molecular weight polymer compound with a high degree of hardness such as acrylic can be used to fabricate the reinforcing structure 230. However, because plastic material has a high degree of insulation, short circuit can be prevented even if there is a direct contact of the comb-shaped bump surface 232 with the fixed end 224 of the terminal 220. In the following, a description of each type of reinforcing structure is described using a diagram with the understanding that material, shape and thickness of the reinforcing structure may be modified accordingly without departing from the scope of this invention.

FIG. 3A is a sectional view showing a first type of reinforcing structure on a card connector assembly according to this invention. As shown in FIG. 3A, the reinforcing structure 230 has a bump bar 240 fastened to the circuit board 20 by soldering, for example. The bump bar 240 has a comb-shaped bump surface 242 that corresponds with the vertical rear surface 216a of the horizontal beam 216. When the elongated expansion card 10 is subjected to an impact force, the comb-shaped bump surface 242 on the bump bar 240 is able to strengthen the horizontal beam 216 structurally. Therefore, the fixed ends 224 of the terminals 220 in the card connector 200 will remain electrically connected despite the impact acting on the connector 200 from the elongated expansion card 10.

Figure 3B:
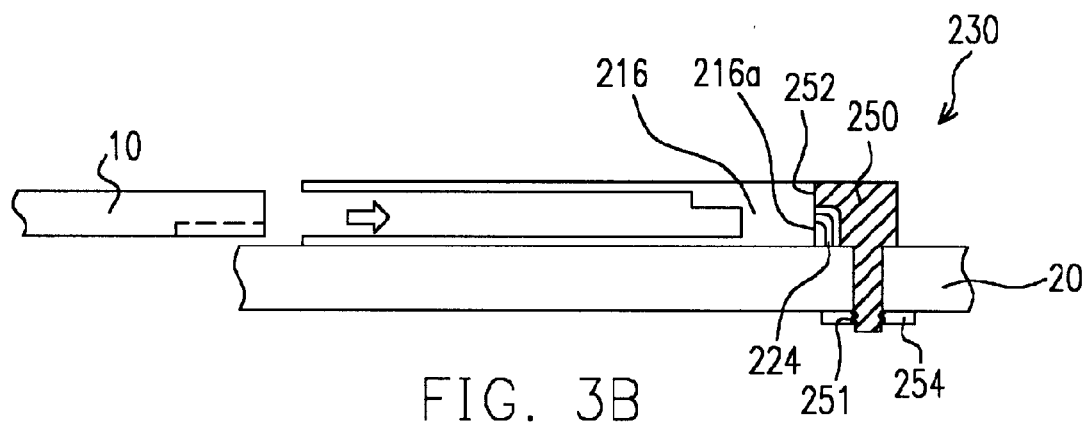

FIG. 3B is a sectional view showing a second type of reinforcing structure on a card connector assembly according to this invention. As shown in FIG. 3B, the reinforcing structure 230 has at least a bump bar 250 and a nut 254. The bump bar 250 has a threaded bolt 251 that passes through the circuit board 20. The nut 254 is screwed onto the protruded bolt 251 and hence the bump bar 250 and the circuit board 20 are tightened together. The bump bar 250 also has a comb-shaped bump surface 252 that is located abutting the vertical rear surface 216a of the horizontal beam 216. When the elongated expansion card 10 is subjected to an impact force, the comb-shaped bump surface 252 on the bump bar 250 is able to strengthen the horizontal beam 216 structurally. Thus, the fixed ends 224 of the terminals 220 in the card connector 200 will remain electrically connected with the printed circuit board 20 despite the impact force.

Figure 3C:
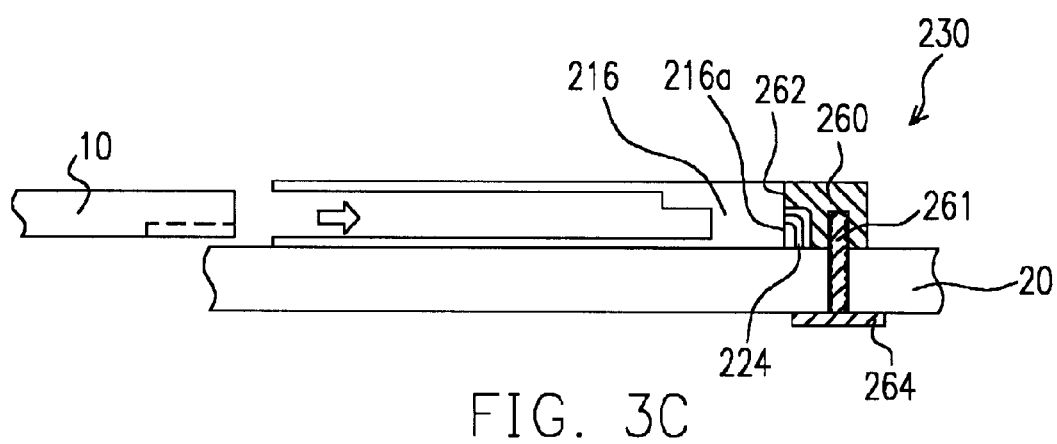

FIG. 3C is a sectional view showing a third type of reinforcing structure on a card connector assembly according to this invention. As shown in FIG. 3C, the reinforcing structure 230 includes a bump bar 260 and a screw 264. In addition, the bump bar 260 has a threaded hole 261. The screw 264 passes through the circuit board 20 and screws into the threaded hole 261 so that the bump bar 260 and the circuit board 20 are tightened together. The bump bar 260 also has OLE_LINK1a comb-shaped bump surface 262 that corresponds with the vertical rear surface 216a of the horizontal beam 216OLE_LINK1. When the elongated expansion card 10 is subjected to an impact force, the comb-shaped bump surface 262 on the bump bar 260 is able to strengthen the horizontal beam 216 structurally. Thus, the fixed ends 224 of the terminals 220 in the card connector 200 will remain electrically connected with the printed circuit board 20 despite the impact.

Figure 3D:
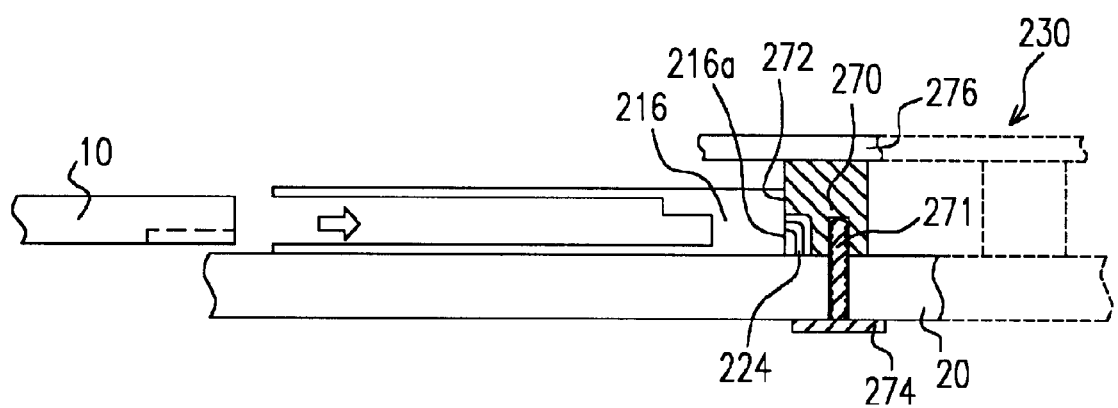

FIG. 3D is a sectional view showing a fourth type of reinforcing structure on a card connector assembly very similar to the one in FIG. 3C. The reinforcing structure 230 is set up inside the outer casing 276 of a PDA body as shown in FIG. 3D. Preferably, the outer casing 276 is used for accommodating the circuit board 20 and other components inside the PDA. The reinforcing structure 230 at least includes a bump bar 270 and a screw 274. The bump bar 270 is riveted to the interior sidewall of the outer casing 276 or is manufactured as an integral part to the interior sidewall of the outer casing 276. In addition, the bump bar 270 has a threaded hole 271. The screw 274 passes through the circuit board 20 and screws into the threaded hole 271 so that the bump bar 270, the outer casing 276 and the circuit board 20 are tightened together. The bump bar 270 also has a comb-shaped bump surface 272 abutting the vertical rear surface 216a of the horizontal beam 216. When the elongated expansion card 10 is subjected to an impact force, the comb-shaped bump surface 272 on the bump bar 270 is able to strengthen the horizontal beam 216 structurally. Thus, the fixed ends 224 of the terminals 220 in the card connector 200 will remain electrically connected with the printed circuit board 20 despite the impact force.

Figure 3E:
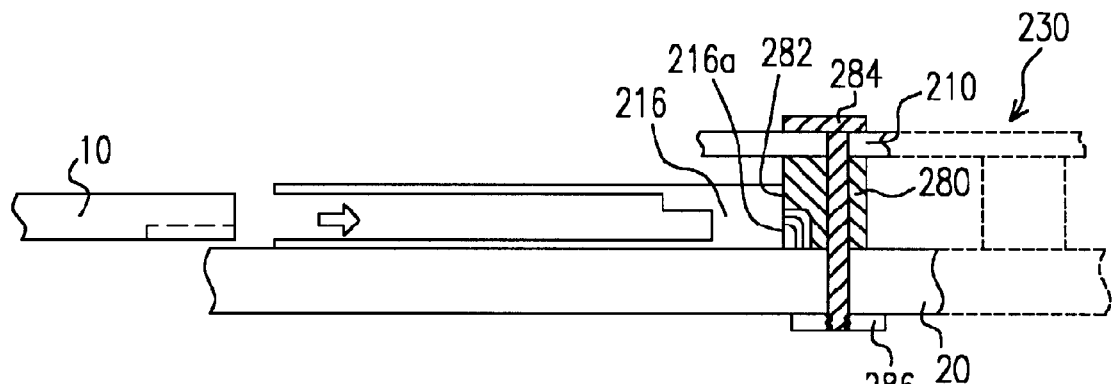

FIG. 3E is a sectional viewshowing a fifth type of reinforcing structure on a card connector assembly very similar to the one in FIG. 3D. The reinforcing structure 230 is similarly strengthened through the outer casing 276 of a PDA body. The reinforcing structure 230 includes a bump bar 280, a screw 284 and a nut 286. The screw 284 passes through the outer casing 276, the bump bar 280 and the circuit board 20. The nut 286 is screwed onto the exposed end of the screw 284 so that the circuit board 20 and the bump bar 280 are tightened to the outer casing 276. The bump bar 280 also has a comb-shaped bump surface 282 that corresponds with the vertical rear surface 216a of the horizontal beam 216. When the elongated expansion card 10 is subjected to an impact force, the comb-shaped bump surface 282 on the bump bar 280 is able to strengthen the horizontal beam 216 structurally. Thus, the fixed ends 224 of the terminals 220 in the card connector 200 will remain electrically connected with the printed circuit board 20 despite the impact force.

Figure 3F:
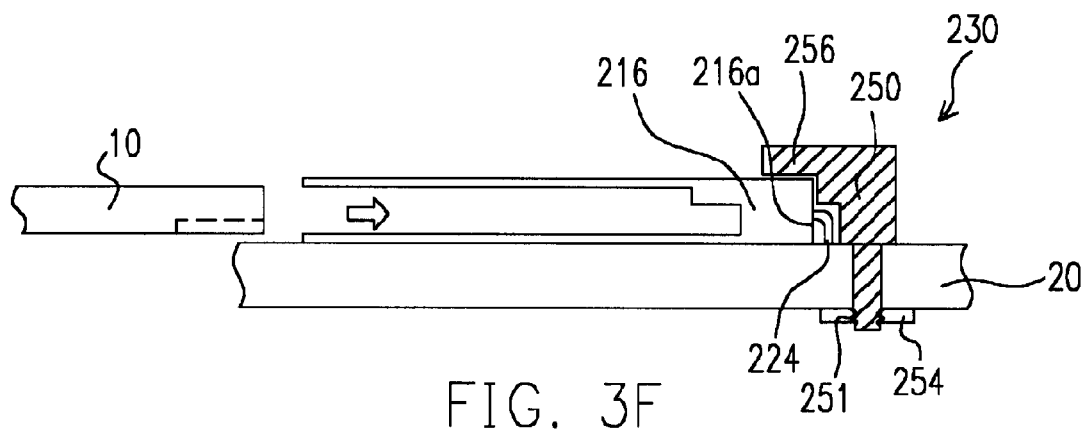
FIG. 3F is a sectional view of an alternative reinforcing structure on a card connector assembly for the one in FIG. 3B.
Figure 3G:
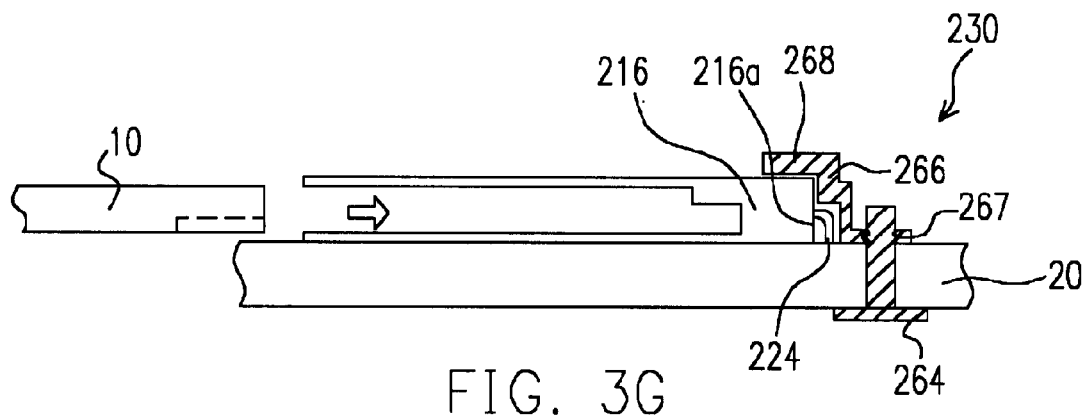
FIG. 3G is a sectional view of an alternative reinforcing structure on a card connector assembly for the one in FIG. 3C.

FIG. 3F is a sectional view of an alternative reinforcing structure on a card connector assembly for the one in FIG. 3B. The reinforcing structure 230 also includes a bump bar 250 and a nut 254. However, the top end of the bump bar 250 has an additional pressing block 256 touching the upper end of the horizontal beam 216 to strengthen the upper end of the horizontal beam 216. FIG. 3G is a sectional view of an alternative reinforcing structure on a card connector assembly for the one in FIG. 3C. The reinforcing structure 230 has a step-like bump bar 266 and a screw 264. The bump bar has a rear plate 267 located in rear of the terminals 224 and engaging with the printed circuit board 20. A threaded hole is defined in the rear plate 267. The screw 264 extends upwardly through the printed circuit board 20 to threadedly engage in the threaded hole thereby securely connecting the bump bar 266 and the printed circuit board 20 together. The bump bar abuts against the vertical rear surface 216a of the horizontal beam 216. Furthermore, the top end of the bump bar 266 has an additional pressing block 268 pressing the upper end of the horizontal beam 216 to strengthen the upper end of the horizontal beam 216.

Figure 4:
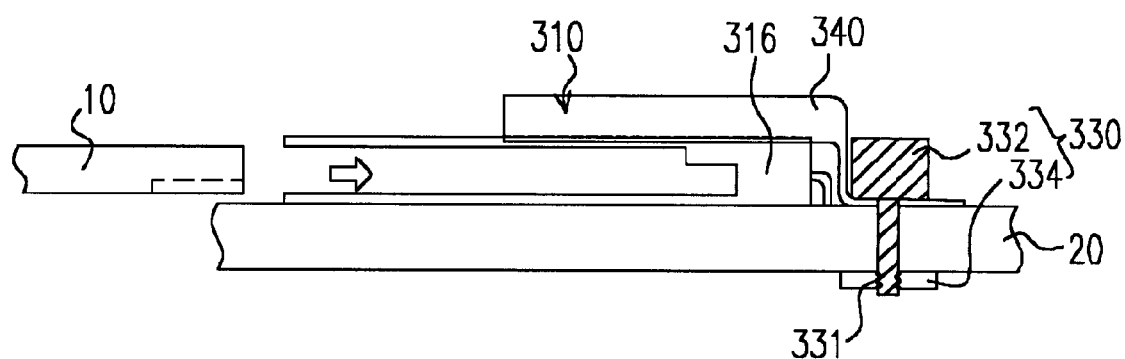
FIG. 4 is a sectional view of a reinforcing structure on a card connector assembly according to a further embodiment of this invention.

FIG. 4 is a sectional view of a reinforcing structure on a card connector assembly according to a further embodiment of this invention. As shown in FIG. 4, a reinforcing structure 330 includes a metallic shielding 340 and a screw 332/nut 3334 assembly 330. The shielding 340 is fixedly secured to an insulated body 310 of the card connector. The shielding 340 strengthens the insulated body 310 and provides electrostatic protection to the card connector and the elongated expansion card 10. The shielding 340 extends rearwards behind the horizontal beam 316 of the insulated body 310 and the terminals of the card connector and has a fixing hole (not labeled) thereon. The fixing hole is located above the circuit board 20 behind the horizontal beam 316 and the terminals. The screw 332 extends through the fixing hole of the shielding 340 and the printed circuit board 20 to threadedly engage with the nut 334 by thread 331. The screw 332 has a head (not labeled) abutting against a vertical part of the shielding 340, whereby an impact force acting on the connector from the elongated expansion card 10 can be effectively resisted by the reinforcing structure 330, and, thus, the terminals of the connector can have a reliable electrical connection with the printed circuit board 20, regardless of the impact force.

Figure 5:
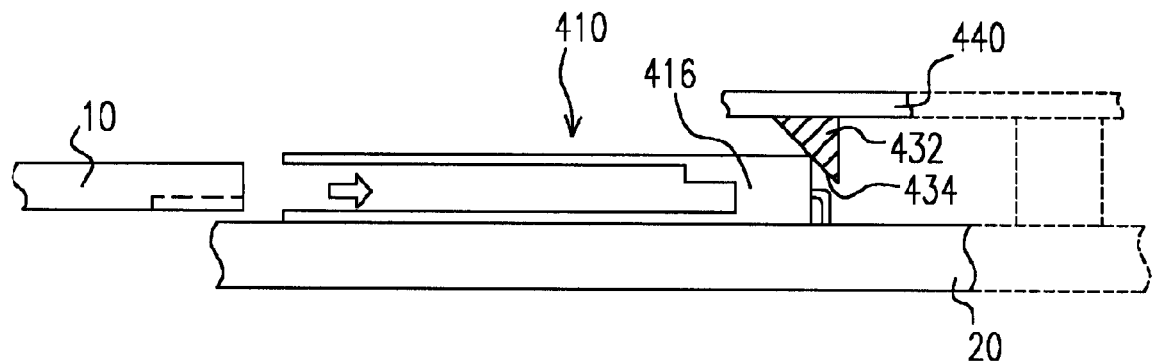
FIG. 5 is a sectional view of a reinforcing structure on a card connector assembly according to a still further embodiment of this invention.

FIG. 5 is a sectional view of a reinforcing structure on a card connector assembly according to still a further embodiment of this invention. One major aspect that differs from the other embodiments is that the reinforcing structure is attached to the interior sidewall of the outer casing 440 of a PDA as an integrative unit. The interior sidewall of the outer casing 440 includes at least a bump spine 432 with a slant surface 434. The slant surface 434 is positioned to contact the corner region of the horizontal beam 416 so that a portion of the impact force can be absorbed by the bump spine 432. When the elongated expansion card 10 is subjected to an impact force, the bump spine 432 reinforces the horizontal beam 416 of the insulated body 410 so that the terminals in the card connector can be electrically connected to the printed circuit board 20.

In summary, the reinforced card connector structure of this invention comprises a card connector, an insulated body, a plurality of terminals and a reinforcing structure. The reinforcing structure is fabricated using any high strength material or high molecular weight polymer compound such as stainless steel alloy or hardened acrylic material. Therefore, any impact forces acting on the elongated expansion card (such as dropping the PDA vertically down onto the floor) will be redirected to the reinforced card connector 100 and absorbed. As a result, the force acting on the fixed ends of the terminals within the card connector is minimized and a failed connection due to the terminals tearing away from the printed circuit board is highly unlikely.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A card connector with reinforcing structure installed on a circuit board, comprising:
    an insulated body having two side beams and a horizontal beam, wherein the horizontal beam joins up the two side beams to form a frame, the side beams each have a sliding groove adapted for accommodating two side edges of an expansion card and the horizontal beam has at least a terminal plugging slot adapted for receiving a front end of the expansion card;
    a plurality of terminals fitted inside the horizontal beam with one end of each terminal extending into the terminal plugging slot and the other end extending away from the terminal plugging slot to connect with the circuit board; and
    a reinforcing structure positioned next to the horizontal beam on a side away from the terminal plugging slot, wherein the reinforcing structure at least comprises a bump bar fixed to the circuit board, the bump bar has a comb-shaped bump surface facing the surface of the horizontal beam on the other side of the terminal plugging slot, and the teeth of the comb-shaped bump surface occupy the space between the other ends of neighboring terminals.

2. The card connector of claim 1, wherein the other ends of the terminals are fixed on the circuit board by surface mounting.

3. The card connector of claim 1, wherein the bump bar is fixed on the circuit board by surface mounting.

4. The card connector of claim 1, wherein the reinforcing structure furthermore comprises a nut and the bump bar has an externally threaded bolt so that the nut can be screwed into the protruding end of the threaded bolt to lock the bump bar and the circuit board together after passing the threaded bolt through the circuit board.

5. The card connector of claim 4, wherein the bump bar furthermore incorporates a pressing block that touches the upper surface of the horizontal beam away from the circuit board.

6. The card connector of claim 1, wherein the reinforcing structure furthermore comprises a screw that passes through the circuit board and screw into an internally threaded hole in the bump bar.

7. The card connector of claim 1, wherein the reinforcing structure furthermore comprises a screw and a nut, the nut screwing onto a protruding end of the screw after passing through the bump bar and the circuit board to thereby fasten the bump bar and the circuit board together.

8. The card connector of claim 1, wherein the reinforcing structure furthermore comprises a screw and a casing, one side of the bump bar is riveted to the casing, and the screw is screwed into an internally threaded hole on the other side of the bump bar after passing through the circuit board to thereby fasten the casing, the bump bar and the circuit board together.

9. The card connector of claim 1, wherein the bump bar is fabricated using plastic or metallic material.

10. A card connector with a reinforcing structure mounted on a circuit board, comprising:
    an insulated body having two side beams and a horizontal beam, wherein the horizontal beam joins up the two side beams to form a frame, the side beams have a sliding groove adapted for accommodating two side edges of an expansion card and the horizontal beam has a terminal plugging slot for receiving a front end of the expansion card;
    a plurality of terminals fitted inside the horizontal beam with one end of each terminal extending into the terminal plugging slot and the other end extending away from the terminal plugging slot to connect with the circuit board; and
    a metallic shielding securely fixed to the insulated body, wherein the metallic shielding has at least a fixing hole positioned on one side of the horizontal beam away from the terminal plugging slot and the metallic shielding also has a reinforcing structure fastened through the fixing hole onto the circuit board.

11. The card connector of claim 10, wherein the reinforcing structure comprises a nut and a screw, the screw extending downwardly through the fixing hole of the metallic shielding and the printed circuit board to threadedly engage with the nut.

12. The card connector of claim 11, wherein the screw has a head abutting against a vertical portion of the metallic shielding in front of the fixing hole.

13. The card connector of claim 12, wherein the metallic shielding provides the card connector protection from electrostatic discharge.

14. A handheld device, comprising:
    a casing;
    a printed circuit board received in the casing;

a card connector mounted on the printed circuit board, said card connector having terminals therein;

an elongated expansion card inserted into the connector and electrically connecting with the printed circuit board via the terminals of the card connector, said elongated expansion card having an exposed portion located outside the casing; and a reinforcing structure engaging with the card connector, said reinforcing structure reinforcing the card connector to resist a force acting thereon when the exposed portion of the elongated expansion card is subjected to an impact force whereby the electrical connection between the expansion card and the printed circuit board via the terminals can be maintained despite the impact force.

15. The handheld device in accordance with claim 14, wherein the reinforcing structure is a bump bar having a comb-shaped bump surface abutting against the card connector.

16. The handheld device in accordance with claim 15, wherein the comb-shaped surface extends across ends of the terminals in electrical connection with the printed circuit board.

17. The handheld device in accordance with claim 15, wherein the bump bar is soldered to the printed circuit board.

18. The handheld device in accordance with claim 15, wherein the bump bar is fixed to the printed circuit board by screwing connection.

19. The handheld device in accordance with claim 14, wherein the reinforcing structure includes a shielding fixed to the card connector and a screw, the terminals having front ends for electrically connecting with the elongated expansion card and rear ends for electrically connecting with the printed circuit board, the shielding having a portion extending rearwards behind the rear ends of the terminals and secured to the printed circuit board by the screw.

20. The handheld device in accordance with claim 14, wherein the reinforcing structure includes a bump spine secured to the casing, the bump spine having a slant surface abutting against the card connector.

* * * * *